No. 891,280. PATENTED JUNE 23, 1908.
T. W. MORGAN.
FRICTION CLUTCH.
APPLICATION FILED MAY 11, 1907.
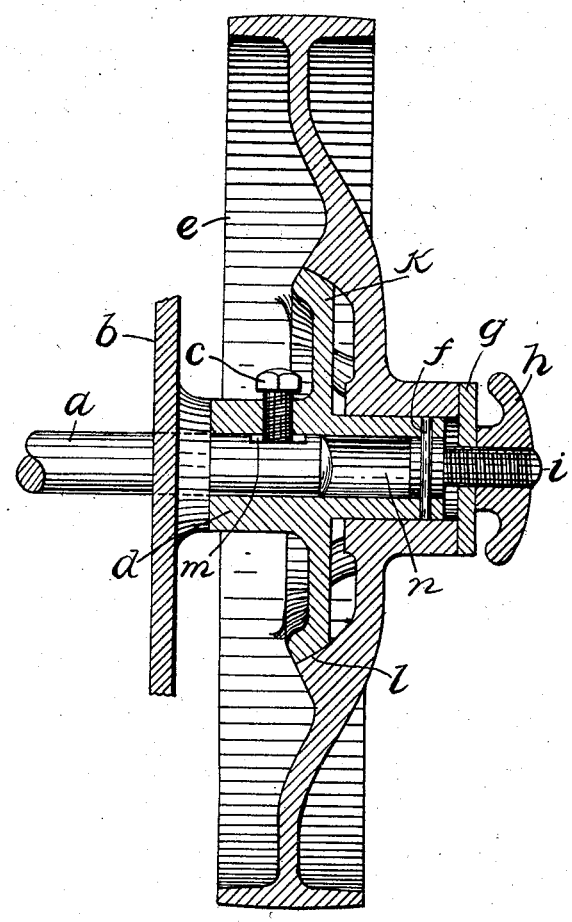
WITNESSES:
O. D. Young
W. W. Beal Jr.
INVENTOR
Thomas W. Morgan,
BY
G. C. Kennedy.
ATTORNEY
THE NORRIS PETERS CO., WASHINGTON, D. C.

UNITED STATES PATENT OFFICE.

THOMAS W. MORGAN, OF WATERLOO, IOWA, ASSIGNOR TO WILBUR W. MARSH, OF WATERLOO, IOWA.

FRICTION-CLUTCH.

No. 891,280.  Specification of Letters Patent.  Patented June 23, 1908.

Application filed May 11, 1907. Serial No. 373,187.

*To all whom it may concern:*

Be it known that I, THOMAS W. MORGAN, a citizen of the United States of America, and a resident of Waterloo, Blackhawk county, Iowa, have invented certain new and useful Improvements in Friction - Clutches, of which the following is a specification.

My invention relates to friction clutches, and the object of my improvements is to provide a simple and easily operated friction-clutch adapted to be quickly manipulated by hand to be engaged or separated as desired. This object I have achieved by the mechanism which is hereinafter described and claimed, and which is illustrated in the accompanying drawing, in which the figure is a central vertical axial section of my said friction-wheel-connection.

Similar letters refer to similar parts throughout the several views.

The end of the shaft $a$ projects a certain distance without the bearing $b$. The projecting end of said shaft has a small excavated seat $m$ for the reception of the set-screw $c$, the latter passing through a bearing-opening in the hub of the friction-disk $k$ to secure the latter to said shaft. The friction-disk $k$ has a projecting hollow cylindrical extension or barrel $n$, and the head of the screw $i$ is adapted to fit within the hollow of said barrel and be secured thereto by means of a key $f$ inserted through registering channels in both said barrel and said head. The friction-wheel $e$ has its hub fitted to rotate upon the exterior of the barrel $n$, and slidable thereupon to a certain extent. The friction-wheel $e$ has a friction-ring $l$ adapted to contact with the friction-disk $f$ when the two are brought into close engagement. A thumb-piece $h$ works upon the screw $i$, a washer $g$ being interposed between said thumb-piece and the ends of the barrel $n$ and the hub of the friction-wheel $e$.

By turning the thumb-piece $h$ a few times in one direction the friction-wheel $e$ is pushed toward the frame $b$ sufficiently to cause its friction-ring $l$ to closely engage with the friction-disk $k$. Motion then imparted to said friction-wheel, causes the shaft $a$, to rotate, while the turning of the thumb-piece $h$ in the opposite direction causes the friction-wheel $e$ to become disengaged from the friction-disk $k$, and to rotate idly.

Having described my invention, what I claim as new, and desire to secure by Letters Patent, is—

1. A friction-clutch, consisting, in combination, of a driven shaft, a friction - disk having a socketed hub detachably secured to the end of said shaft, the socketed hub being extended outwardly from the outer face of said disk, a band - wheel having a socketed hub rotatably and slidably mounted on the outer extension of the socketed hub of said friction-disk and having a friction-surface adapted to be contacted with the friction surface of said friction-disk, an axial screw having its head detachably secured within the socket of said friction-disk and projecting outwardly therefrom, and a thumb-nut mounted to work on said screw and detachably engage the outer surface of said band-wheel.

2. A friction-clutch, consisting, in combination, of a driven shaft, a friction-disk having a socketed hub detachably secured to the end of said shaft, the socketed hub being extended outwardly from the outer face of said disk, a band-wheel having a socketed hub rotatably and slidably mounted on the outer extension of the socketed hub of said friction-disk and having a friction-surface adapted to be contacted with the friction-surface of said friction-disk, an axial screw having its head detachably secured within the socket of said friction-disk and projecting outwardly therefrom, a washer on said screw next to the outer surface of said band - wheel, and a thumb-nut mounted to work on said screw and engage said washer to cause the latter to frictionally engage the outer surface of said band-wheel.

Signed at Waterloo, Iowa, this 23rd day of April 1907.

THOMAS W. MORGAN.

Witnesses:
O. D. YOUNG,
G. C. KENNEDY.